(No Model.)
J. J. LAIN.
TUG AND HIP STRAP ATTACHMENT FOR HARNESS.
No. 325,547. Patented Sept. 1, 1885.
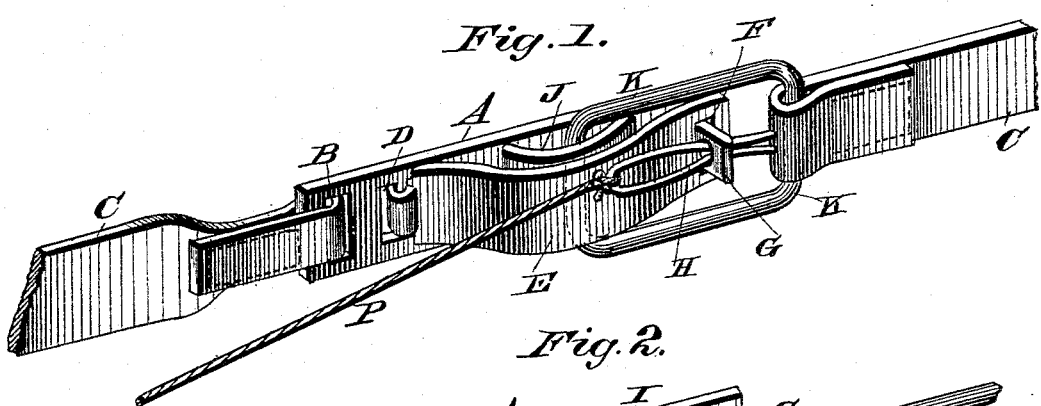
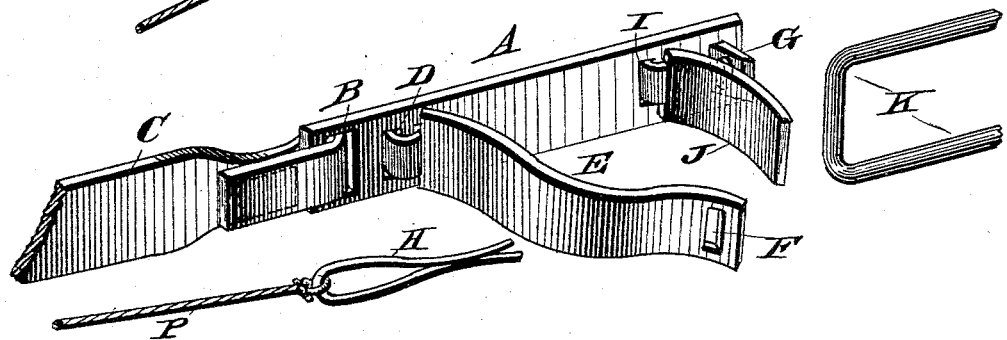
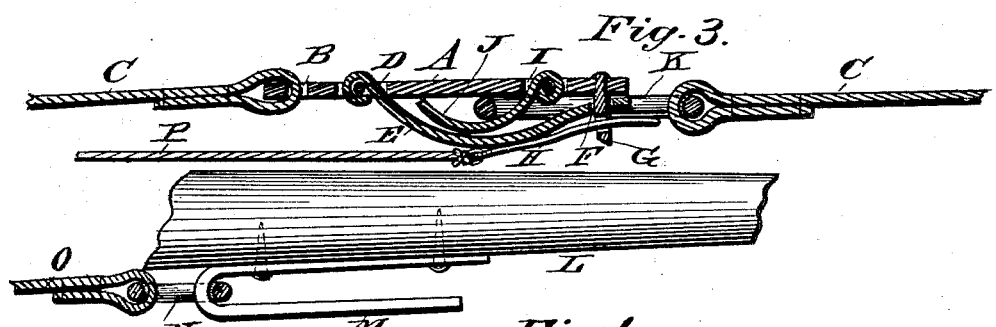
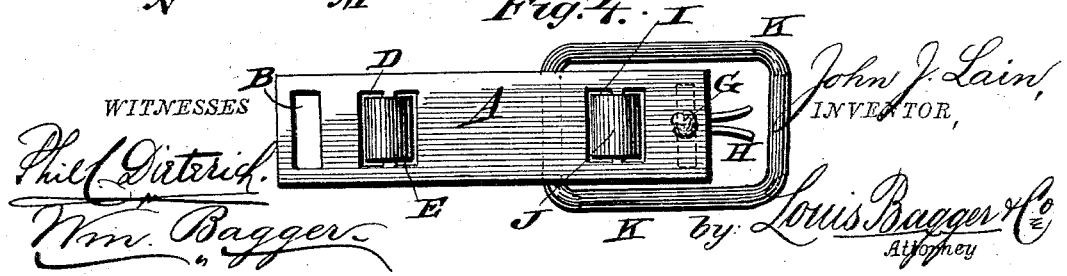
WITNESSES
Phil. Dieterich
Wm. Bagger
John J. Lain,
INVENTOR,
by Louis Bagger & Co.
Attorney

UNITED STATES PATENT OFFICE.

JOHN JAMES LAIN, OF BRAZOS POINT, TEXAS.

TUG AND HIP STRAP ATTACHMENT FOR HARNESS.

SPECIFICATION forming part of Letters Patent No. 325,547, dated September 1, 1885.

Application filed June 6, 1885. (No model.)

*To all whom it may concern:*

Be it known that I, JOHN J. LAIN, a citizen of the United States, and a resident of Brazos Point, in the county of Bosque and State of Texas, have invented certain new and useful Improvements in Tug and Hip Strap Attachments for Harness; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved detaching attachment for tug-straps. Fig. 2 is a perspective view showing the same in an open position. Fig 3 is a horizontal sectional view, and Fig. 4 is a side view showing the inner side of the device.

The same letters refer to the same parts in all the figures.

This invention relates to an improved tug and hip strap attachment for harness which shall admit of the rapid and convenient attachment or detachment of the horse or horses to or from the vehicle, and which, in case the animal becomes unruly, shall enable it to be instantly detached, thereby avoiding danger of accidents; and it has for its object to provide a device of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings hereto annexed, A designates a metallic plate or bar, which is provided at its rear end with a vertical slot, B, whereby it is attached to the short rear end of the tug or trace C.

The plate or bar A is provided near its rear end with a slot, D, in which is hinged a forwardly-extending angular or curved arm or lever, E, the front end of which has a slot, F, adapted to fit over a perforated lug, G, extending laterally from the front end of the plate A, and through which passes a spring-key, H, whereby the said arm or lever may be locked or secured in a closed position.

Near the front end of the plate A is another slot, I, in which is pivoted a short angular or curved arm or lever, J, adapted to be folded in a rearward direction under the lever E, which latter serves to secure it in position when closed. The angular or curved lever J serves to receive and to hold in contact with the plate A a ring or link, K, which is attached to the rear end of the long or front portion of the tug or trace, which may thus be connected with the rear portion, C, of the same.

L is one of the thills, which is provided on its upper or outer side with a forwardly-extending hook, M, to receive a ring, N, at the lower end of the hip-strap O, which may thus be connected detachably with the said thill.

P is a strap or cord attached to the rear end of the spring-key H, and leading to some point convenient to the driver, who by means of the said strap may withdraw the said key, so as to operate the device in case of emergency.

From the foregoing description, taken in connection with the drawings hereto annexed, the operation and advantages of this invention will be readily understood.

It is obvious that two of the devices are to be used—one at either side. In order to attach the horse the hip-strap rings are simply slipped upon the hooks M, and the links K are placed between the plates A and levers J, which are then secured by means of the levers E and keys H, as described. In order to detach the horse the operation is simply reversed.

In case of emergency when the animal becomes unruly the keys H may be withdrawn by means of the straps P, thus causing the strain of the links K to throw open the levers which hold the said link, and instantly detaching the horse, the hip-strap rings simply sliding off the hooks M.

This invention may be readily applied to double as well as to single harness.

I am aware that it is not new to make attaching devices for harness having hinged locking-pieces secured by means of a spring-key passing through a hole in a perforated lug, and I do not claim such construction, broadly; but

I claim and desire to secure by Letters Patent of the United States—

1. In a harness attachment, the combination, with the traces, of a plate secured thereto, the front end of said plate being provided with a laterally-extending perforated lug or projection, a backwardly-folding locking-piece hinged to the front end of said plate near said projection, and adapted to engage with and retain the front end of the trace, a forwardly-folding locking-piece secured to the rear part of said plate, and provided with a slot in its free end adapted to engage with the perforated projection, a spring-key fitting in said projection, and means for withdrawing said key, substantially as and for the purpose set forth.

2. In a harness attachment, the combination, with a suitable detaching device, of a rearwardly-extending hook upon the side of each one of the thills, and a ring upon the lower end of the hip-strap, substantially as and for the purpose set forth.

In testimony that I claim the foregoing as my own I have hereto affixed my signature in presence of two witnesses.

JOHN JAMES LAIN.

Witnesses:
R. RANSONE,
C. M. MOORING.